Sept. 30, 1924.
J. J. MIZER
1,510,012
TELESCOPIC HANDLE FOR AUTOMOBILE JACKS
Filed March 28, 1923
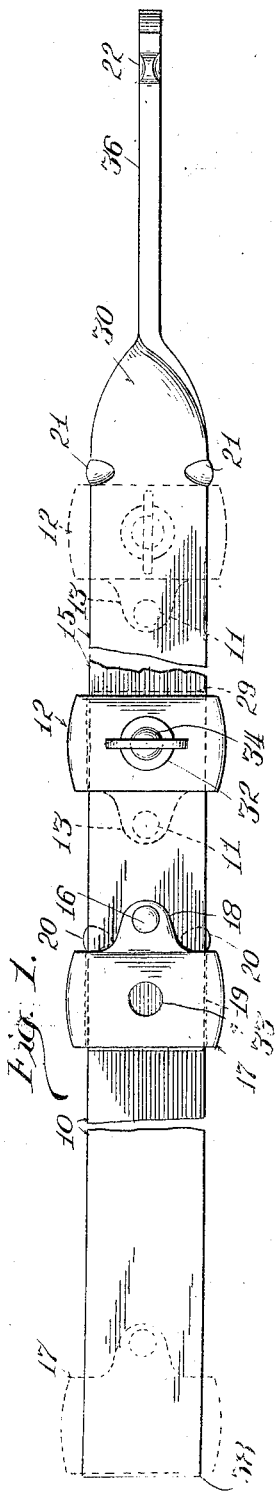
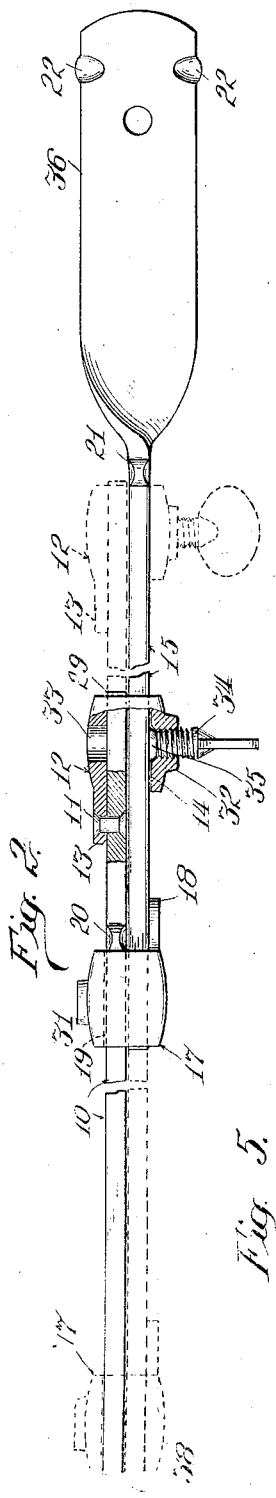
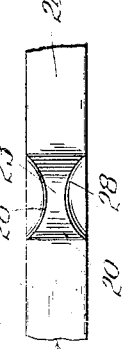
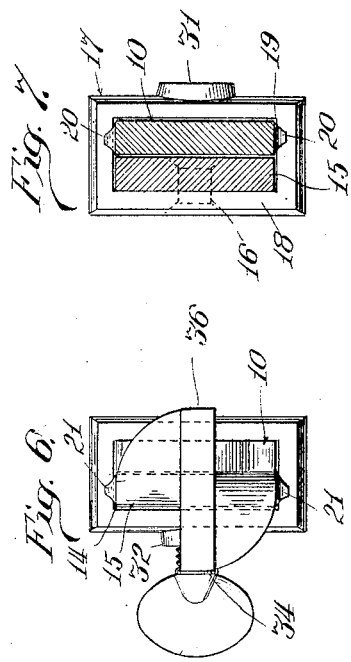
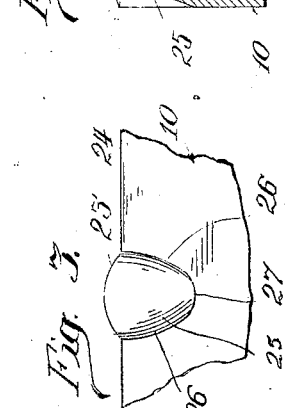
Inventor
Joseph J. Mizer,
Barnett Truman,
Attorneys

Patented Sept. 30, 1924.

1,510,012

UNITED STATES PATENT OFFICE.

JOSEPH J. MIZER, OF RACINE, WISCONSIN, ASSIGNOR TO WALKER MANUFACTURING COMPANY, OF RACINE, WISCONSIN, A CORPORATION OF WISCONSIN.

TELESCOPIC HANDLE FOR AUTOMOBILE JACKS.

Application filed March 28, 1923. Serial No. 628,216.

*To all whom it may concern:*

Be it known that I, JOSEPH J. MIZER, a citizen of the United States, residing at Racine, in the county of Racine and State of Wisconsin, have invented certain new and useful Improvements in Telescopic Handles for Automobile Jacks, of which the following is a specification.

My invention pertains to detachable automobile jack handles which are reciprocatory, and adapted for telescopic folding.

One of the objects of my invention is to provide a non-rotating detachable automobile jack handle having integral stops which positively prevent loss by separation of any portion of the handle and furnish a positive guide in the use thereof.

Another object of my invention is to provide a device of the above mentioned character having means to selectively vary its length and permit relative adjustment where available operating space is limited.

Other objects and advantages of the invention will be apparent during the course of the following description.

In the accompanying drawings forming a part of this specification and in which like numerals are employed to designate like parts throughout the same, Fig. 1 is a longitudinal side view in operable position of an automobile jack handle embodying my invention, showing the device extended to its position of maximum length, the dotted lines showing arrangement of parts in the telescoped or closed position of minimum length.

Fig. 2 is a top view.

Figs. 3, 4, and 5, are fragmentary enlarged views of the side, end and top, respectively, of the integral stop.

Fig. 6 is an end view of an automobile jack handle embodying my invention, showing relative positions of the integral stops and the handle portion.

Fig. 7 is an enlarged end view of the continuous sleeve.

In the drawings, wherein for the purpose of illustration is shown a preferred embodiment of my invention, the numeral 10 designates a longitudinally adjustable member, to which is securely fastened by any suitable means such as a rivet 11, a slide block or continuous sleeve 12 having a projection or tongue 13. This continuous sleeve 12 has an open portion 14, through which, adapted to slidably fit, is passed a second longitudinally adjustable member 15.

Securely fastened by any suitable means, such as a rivet 16, to the second longitudinally adjustable member 15, is a second slide block or continuous sleeve 17, also having a tongue or projection 18 and an open portion 19 through which, also adapted to slidably fit, is passed the first longitudinally adjustable member 10. The continuous sleeve 17 is similar to the continuous sleeve 12, except for a part to be hereinafter described.

Formed in the longitudinally adjustable members 10 and 15 are integral stops 20, 21 and 22. As shown in Figs. 3, 4 and 5, the integral stop consists of an upper portion 23 projecting for a suitable distance above the surface 24 of the longitudinally adjustable members. This portion 23 is of a preferably slightly rounded triangular form longitudinally. Transversely the portion 23 forms in section a slightly rounded three-sided figure 25. Below the surface 24 longitudinally, the integral stop takes the form of two approximately circular arcs 26 merging into a smaller arc 27, as shown. From the top view shown in Fig. 5, it will be seen that the side portions 28 form approximately circular arcs. The integral stops 20 are formed in the body of the longitudinally adjustable members by any suitable means, preferably by stamping in a press, and are placed at a distance from the end 29 of the member 10 preferably equal to the combined lengths of the two tongues or projections 13 and 18 plus the length of the open portion 14 of the continuous sleeve 12. The integral stops 21 are placed at a point where the portion 30 of the member 15 is twisted or bent to form an approximately right angle with the main or body portion of this member as hereinafter described. The integral stops 22 are preferably located adjacent to the outer end of the twisted portion.

The sleeves 12 and 17 have bosses or lugs 31 and 32 formed upon their wider faces. Through the boss 32 of the continuous sleeve 12, a threaded opening is provided for receiving a set screw 34, an opening 33 being provided through the directly opposite wall portion of the sleeve for affording access to the inner end of the screw for forming a head 35 thereon by means of a punch so as to prevent withdrawal of the screw.

A handle portion 36 is formed near the end of the member 15, preferably by twisting or bending a substantial portion on the free end of the member 15 to form an approximately flat surface at an angle with the main or body portion of the member. The integral stops 22 constitute a so-called "fool-proof" feature, so that in using the device the handle portion cannot be inserted in the jack socket.

The end portion 38 is made preferably smooth and is adapted for ready insertion in the jack socket.

Any ordinary suitable material, such as commercial steel flats or bars or malleable iron for the continuous sleeves, may be used for manufacturing my invention.

I thus provide maximum strength with a minimum of material. A single form of casting serves for the two sleeves, the integral stops are cheaply formed, a suitable handle is provided without using separate parts therefor, and the entire device is adaptable for use under varying conditions.

In operation the end portion 38 is inserted in the jack socket and the screw 34 loosened. The longitudinally adjustable members may then be slid through the continuous sleeves to any desired position. The thumb screw is then tightened and the device operated. My device is adapted for use with any type of automobile jack operable by a reciprocatory arm moving in one plane. After use, the end portion 38 is withdrawn from the jack socket, the thumb screw loosened, and the members slid through the continuous sleeves into a compact position for storage in a small space such as a tool box.

It is to be understood that the form of my invention herewith shown and described is to be taken as a preferred example of the same, and that various changes in the shape, size and arrangement of parts may be resorted without departing from the spirit of the invention or the scope of the subjoined claims.

I claim:

1. A telescopic jack handle, comprising two flat bar members, the free end of one member adapted to enter the socket of a jack, and a handle formed on the free end of the other member, a sleeve permanently secured to the opposite end of each of the members and having slidable engagement with the body portion of the other member, and an integral stop on the handle member, just beyond the handle portion, to engage the sleeve on the other member and prevent disengagement of the members when telescoped to inoperative position, and an integral stop on the jack-engaging member, near its sleeve-carrying end to limit movement of the other sleeve thereon when the parts are moved to operative position.

2. A telescopic jack handle, comprising two flat bar members, the free end of one member adapted to enter the socket of a jack, and a handle formed on the free end of the other member, a sleeve permanently secured to the opposite end of each of the members and having slidable engagement with the body portion of the other member, and integral stops formed on the bar members which engage the sleeves to limit the respective sliding movement of the members in either direction.

3. A jack handle comprising two flat metal bars, two slide blocks formed separately from the bars, means for connecting said blocks with the bars respectively, each bar being slidable longitudinally through the block carried by the other bar, and integral means struck up from the bars for engaging the slide blocks to limit the sliding movement of said bars so as to prevent disconnection of one bar from the other.

4. In a detachable reciprocatory automobile jack handle, the combination with longitudinally adjustable members having means for releasably retaining said members in relative position, of integral stops of a rounded and approximately triangular form, continuous sleeves having lugs, and a handle portion forming an angle with said members.

5. In a detachable reciprocatory automobile jack handle, the combination with longitudinally adjustable members having means for releasably retaining said members in relative position, of means to selectively vary the length thereof, integral stops of an approximately triangular form, continuous sleeves having lugs and releasable retaining means, and a handle portion forming an angle with said members.

6. A telescoping jack handle comprising two flat metal members each having a sleeve secured thereto to telescopically receive the other member, the free end of one member adapted to enter the socket of a jack and the free end of the other member being twisted to provide a hand hold the flat surface of which is at an angle to the flat surface of the body of said member.

7. A telescopic jack-handle, comprising two members formed of flat bar metal, a sleeve secured to one end of each of the members and adapted to slidably engage the body portion of the other member, the free end of one bar member adapted to enter the socket of a jack, the free end of the other member being twisted to form a hand hold the flat portion of which is at an angle to the flat surface of the body portion, the body portion of this member, beyond the hand hold, being of substantially the same length as the other member having the jack engaging portion, so that in telescoped position the two members will overlap each other throughout their entire length, except for the twisted hand hold.

8. A telescopic jack-handle, comprising two members formed of flat bar metal, a sleeve secured to one end of each of the members and adapted to slidably engage the body portion of the other member, the free end of one bar member adapted to enter the socket of a jack, the free end of the other member being twisted to form a hand hold the flat portion of which is at an angle to the flat surface of the body portion, and an integral stop formed near the end of the hand hold to prevent insertion of this member in the jack.

9. A telescopic jack-handle, comprising two members formed of flat bar metal, a sleeve secured to one end of each of the members and adapted to slidably engage the body portion of the other member, the free end of one bar member adapted to enter the socket of a jack, the free end of the other member being twisted to form a hand hold the flat portion of which is at an angle to the flat surface of the body portion, the end of the hand hold being deformed to prevent insertion of this part in the jack.

10. A jack handle comprising two bars, two slide blocks carried by said bars respectively, each bar being slidable longitudinally through the block carried by the other bar, and a stop formed integrally with one of said bars adapted by contact with the slide block carried by the other bar to limit the elongation of said handle.

JOSEPH J. MIZER.

Certificate of Correction.

It is hereby certified that in Letters Patent No. 1,510,012, granted September 30, 1924, upon the application of Joseph J. Mizer, of Racine, Wisconsin, for an improvement in "Telescopic Handles for Automobile Jacks," errors appear in the printed specification requiring correction as follows: Page 2, line 79, claim 3, after the word "blocks" insert the word *fixedly;* same page, line 130, claim 7, for the word "length" read *lengths;* and that the said Letters Patent should be read with these corrections therein that the same may conform to the record of the case in the Patent Office.

Signed and sealed this 16th day of December, A. D. 1924.

[SEAL.]

KARL FENNING,
*Acting Commissioner of Patents.*